(12) United States Patent
De Jong et al.

(10) Patent No.: US 11,112,626 B2
(45) Date of Patent: Sep. 7, 2021

(54) METHOD FOR DETECTING BREAKAGE OF SUBSTRATE OF A SWITCHABLE OPTICAL ELEMENT AND SWITCHABLE OPTICAL DEVICE

(71) Applicant: MERCK PATENT GMBH, Darmstadt (DE)

(72) Inventors: Ties De Jong, Utrecht (NL); Paul Bakker, Oirschot (NL)

(73) Assignee: MERCK PATENT GMBH, Darmstadt (DE)

( * ) Notice: Subject to any disclaimer, the term of this patent is extended or adjusted under 35 U.S.C. 154(b) by 190 days.

(21) Appl. No.: 16/481,719

(22) PCT Filed: Jan. 24, 2018

(86) PCT No.: PCT/EP2018/051636
§ 371 (c)(1),
(2) Date: Jul. 29, 2019

(87) PCT Pub. No.: WO2018/138105
PCT Pub. Date: Aug. 2, 2018

(65) Prior Publication Data
US 2019/0391419 A1    Dec. 26, 2019

(30) Foreign Application Priority Data

Jan. 27, 2017 (EP) ..................... 17153429

(51) Int. Cl.
*G02F 1/13* (2006.01)
*E06B 9/24* (2006.01)
(Continued)

(52) U.S. Cl.
CPC .............. *G02F 1/1309* (2013.01); *B60J 3/04* (2013.01); *B60R 25/34* (2013.01); *E06B 7/28* (2013.01);
(Continued)

(58) Field of Classification Search
None
See application file for complete search history.

(56) References Cited

U.S. PATENT DOCUMENTS 3,947,837 A    3/1976   Bitterice
8,872,524 B2 * 10/2014 Hori .................... G01R 31/3277
                                                 324/555
(Continued)

FOREIGN PATENT DOCUMENTS

EP          0806658 A1 * 11/1997 ........... G01N 27/205

OTHER PUBLICATIONS

R. Baetens et al.: "Properties, requirements and possibilities of smart windows for dynamic daylight and solar energy control in buildings: A state-of-the-art review", Solar Energy Materials & Solar Cells, vol. 94, 2010, pp. 87-105, XP026815508.
(Continued)

*Primary Examiner* — Jermele M Hollington
(74) *Attorney, Agent, or Firm* — Millen, White, Zelano & Branigan, P.C.

(57) ABSTRACT

A switchable optical element and method for detecting breakage of a substrate (A, B) of at least one switchable optical element (10) having a first substrate (A) and a second substrate (B), the first substrate (A) being coated with a first electrode and the second substrate (B) being coated with a second electrode, and a switchable layer (14), the switchable layer (14) being sandwiched between the first substrate (A) and second substrate (B), the first electrode and second electrode each having at least one contact, by
i) measuring a change in a differential signal measured at two contacts of a substrate (A, B),
ii) measuring a change in capacitance between the two substrates (A, B),
iii) measuring a change in resistance of at least one of the substrates (A, B),
(Continued)

iv) measuring a change in current applied to the switchable optical element (10).

15 Claims, 9 Drawing Sheets

(51) Int. Cl.
  *E06B 7/28* (2006.01)
  *B60J 3/04* (2006.01)
  *B60R 25/34* (2013.01)
(52) U.S. Cl.
  CPC ........ *E06B 9/24* (2013.01); *E06B 2009/2464* (2013.01)

(56) References Cited

U.S. PATENT DOCUMENTS

| | | | |
|---|---|---|---|
| 9,983,452 B2 * | 5/2018 | Jia | G02F 1/136259 |
| 2002/0021481 A1 | 2/2002 | Lin et al. | |
| 2012/0261663 A1 | 10/2012 | Tsuji | |

OTHER PUBLICATIONS

International Search report PCT/EP2018/051636 dated Jun. 5, 2018 (pp. 1-4).

* cited by examiner

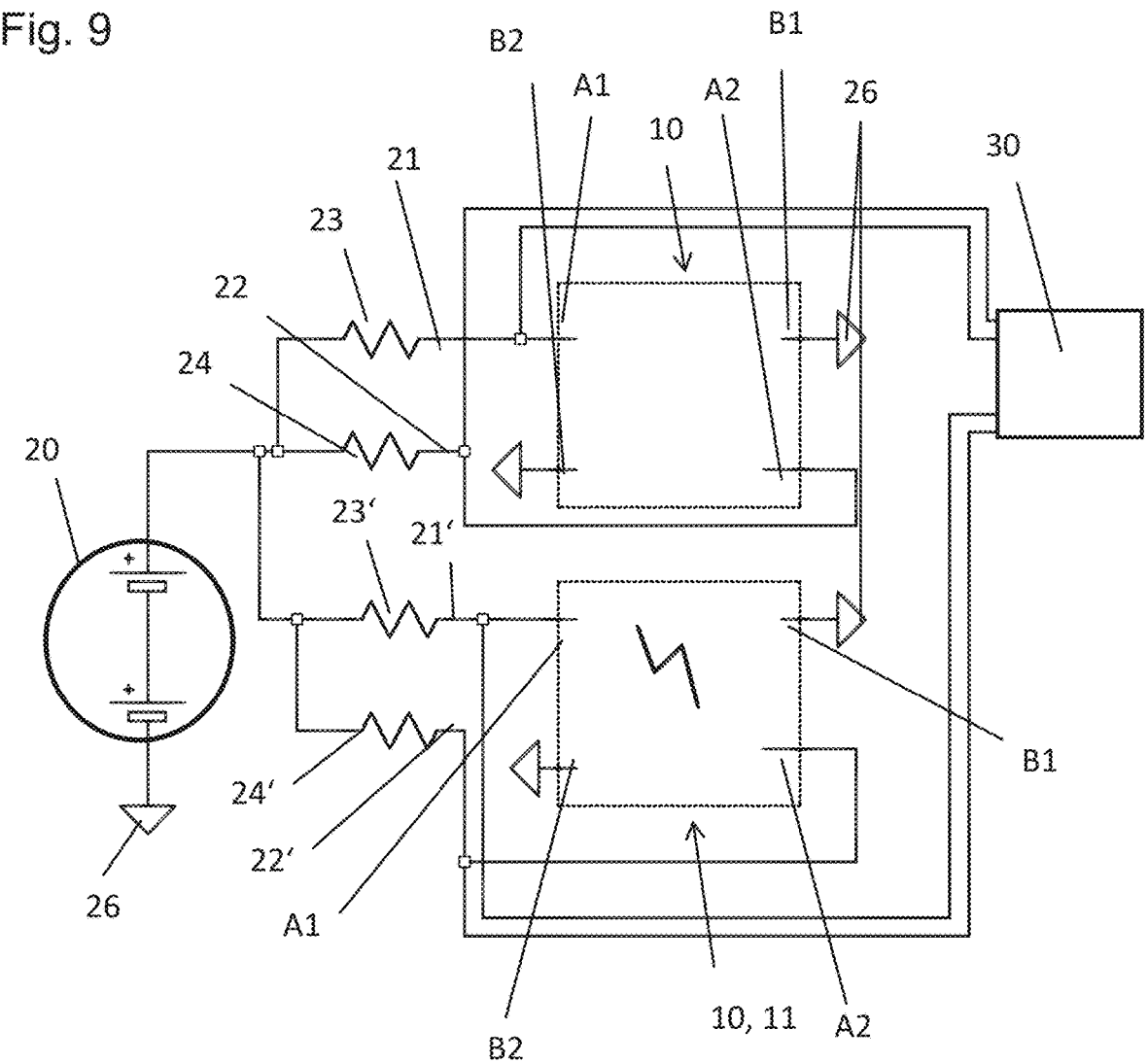

METHOD FOR DETECTING BREAKAGE OF SUBSTRATE OF A SWITCHABLE OPTICAL ELEMENT AND SWITCHABLE OPTICAL DEVICE

The invention relates to a method for detecting breakage of a substrate of at least one switchable optical element, wherein the at least one switchable optical element comprises a first substrate and a second substrate, the first substrate being coated with a first electrode and the second substrate being coated with a second electrode, and a switchable layer, the switchable layer being sandwiched between the first and second substrate. A further aspect of the invention relates to a switchable optical device capable of detecting breakage of a switchable optical element.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal based devices employ a change in the orientation of liquid crystal molecules between two conductive electrodes by applying an electric field which results in a change of their transmittance.

Smart windows may be used for dynamically controlling the transmission of light and heat. Smart windows comprise a switchable optical element having a switchable layer capable of adopting different states. The switchable layer is embedded between two substrates. Smart windows may be used as windows in buildings and vehicles.

In many applications in buildings or vehicles the use of alarm glass is required. Alarm glass is a toughened glass which may be combined with an integrated electrical circuit. The circuit is typically formed by a conductor loop. The conductor loop is interrupted when the glass breaks. Alternatively, a microphone may be attached to the glass. The microphone detects vibrations when the glass breaks or when someone attempts to break the glass.

Toughened glass is a type of safety glass processed by controlled thermal or chemical treatments to increase its strength compared with normal glass. Tempering puts the outer surfaces into compression and the inner surfaces into tension. Such stresses cause the glass, when broken, to crumble into small granular chunks instead of splintering into jagged shards as plate glass. By breaking into small granular chunks an integrated electrical circuit such as a conductor loop is reliably broken when the glass breaks.

In a smart window having a liquid crystal layer as switchable layer said switchable layer is sandwiched between two glass substrates. In order to form a switchable layer of uniform optical properties, the glass substrates must be sufficiently flat. Toughened glass does not fulfill this requirement.

The capability of glass breakage detection can be provided to a switchable optical element by laminating such an alarm glass comprising a layer of toughened class and an electrical circuit to one side of the switchable optical element. However, the additional layer is undesirable for esthetic reasons. Additionally, the added layer of alarm glass makes the resulting smart window more complicated and expensive. Additionally, smart windows exhibit further failure mechanisms due to their electrical behavior which may not be detected by an alarm glass laminated to the switchable optical element. For example, damages affecting only one of the substrate layers of the switchable optical element cannot be detected using a laminated alarm glass. Such failures are only detectable as a malfunctioning, poorly switching window. Further, toughened glass is not flat and may cause optical imperfections when laminated with a switchable optical element.

It is an object of the present invention to provide a method capable of detecting breakage of a switchable optical element.

A further object of the present invention is providing a method capable of detecting malfunctions caused by breakage of at least one of the substrate layers of a switchable optical element.

A method for detecting breakage of a substrate of at least one switchable optical element is provided. The at least one switchable optical element comprises a first substrate and a second substrate, the first substrate being coated with a first electrode and the second substrate being coated with a second electrode, and a switchable layer, the switchable layer being sandwiched between the first and second substrate, the first electrode and second electrode each having at least one contact.

The method further comprises at least one of
i) measuring a change of a differential signal measured between two contacts of a substrate, and
ii) measuring a change in capacitance between the two substrates,
iii) measuring a change in resistance of at least one of the substrates,
iv) measuring a change in a current applied to the switchable optical element.

In a first variant i), the method comprises the steps of
a) applying an electric field between the first electrode and the second electrode by applying a test signal provided by a test signal source to the at least one switchable optical element, wherein the test signal is an AC signal, and wherein an output of the test signal source is split into two signal lines, the first electrode having at least two contacts and each signal line being connected with another one of the contacts of the first electrode, and the at least one contact of the second electrode being connected to a reference potential,
b) measuring of a differential signal between the two signal lines, and
c) detecting a broken substrate if at least one parameter of the differential signal exceeds a predetermined threshold or if a change of at least one parameter of the differential signal exceeds a predetermined threshold, wherein the parameter is preferably an amplitude, a phase shift and/or a waveform deformation.

In a second variant ii), the method comprises the steps of
a) measuring a capacitance between one contact of the first electrode and one contact of the second electrode, and
b) detecting a broken substrate if the measured capacitance is below a predetermined threshold or if change in the measured capacitance exceeds a predetermined threshold.

In a third variant iii), the method comprises the steps of
a) measuring an electrical resistance between two contacts of the first electrode and/or measuring an electrical resistance between two contacts of the second electrode, the first electrode and/or the second electrode each having at least two contacts, and
b) detecting a broken substrate if the measured resistance exceeds a predetermined threshold or if a change in the measured resistance exceeds a predetermined threshold.

In a forth variant iv), the method comprises the steps of a) applying an electric field between the first electrode and the second electrode by applying an AC driving signal to the at least one contact of the first electrode and to the at least one contact of the second electrode, the AC driving signal being configured to switch and/or hold the switchable optical element in one of the states of the switchable optical element, and b) measuring a current of the AC driving signal, and detecting a broken substrate if the measured current exceeds a predetermined threshold or if a change in the measured current exceeds a predetermined threshold.

All four variants i) to iv) of the method may be used alone or in combination with one or more of the further variants.

Additionally or alternatively, variant i) may be carried out wherein the first substrate and the second substrate are interchanged. E. g. the test signal is applied to two contacts of the second electrode and at least one contact of the first electrode is connected to the reference potential.

The switchable optical element is preferably a sandwich structure wherein a switchable layer is embedded between two substrate layers.

The switching layer preferably comprises a liquid-crystalline medium. A liquid-crystalline medium is defined as a substance having the properties of a liquid crystal. Typical liquid-crystalline media comprise at least one composition having elongated rod-shaped molecules. The two substrates and the liquid-crystalline medium are arranged as a cell wherein the liquid-crystalline medium is placed in the gap formed by the two substrates. The size of the gap is preferably from 1 μm to 300 μm, preferably from 3 μm to 100 μm and more preferably from 20 μm to 100 μm. The liquid-crystalline media used in conjunction with the present invention have at least two states. The state of the liquid-crystalline medium is controlled using an electric field.

Each of the two substrates is coated with an electrode. The electrode may be transparent, non-transparent or semi-transparent. Preferably, the electrode is semi-transparent or transparent.

In order to apply an electric field to the switchable layer, an AC driving signal is applied between the two electrodes. When the switchable layer is exposed to an electric field by applying the AC driving signal, the alignment of the liquid-crystal molecules is changed, thus changing the state of the switchable layer.

The AC driving signal is preferably a periodic signal such as for example a square signal or a sine signal. Preferably the AC driving signal has a frequency of from 0.01 Hz to 100 Hz.

The amplitude of the AC driving signal, which may be given as a peak to peak voltage, is preferably chosen such that the resulting electric field is sufficient to switch the switchable layer and/or to hold the switchable layer in the desired state.

The electric properties of the switchable optical element may be represented in a simple equivalent circuit wherein a first resistor representing the first electrode, a capacitor representing the switchable layer and a second resistor representing the second electrode are connected in series to a source of the AC driving signal.

In a damaged switchable optical element the properties of the resistors and capacitors change. In addition, a short circuit between the first and second electrodes may occur which may be represented in the basic model by a further resistor connected parallel to the capacitor. If an electrode has more than one contact, a more complex equivalent circuit should be used wherein the first and second electrodes are represented by a network of smaller resistors and the switchable layer is likewise represented by a plurality of smaller capacitors. Such an equivalent circuit is shown in FIG. 3.

The proposed method makes use of these changes of the electrical properties in order to detect a broken substrate of the switchable optical element.

In the first variant i) an active measurement is performed wherein a test signal is applied to the switchable optical element and a response is measured. By use of this test signal, the measurement can be performed independently from the normal operation of the switchable optical element wherein an AC driving signal is applied. The test signal is preferably also active when the switchable optical element is in an OFF state where no AC driving signal is applied. The test signal should not affect the state of the switchable optical element. Thus, the amplitude and/or the frequency are chosen such that no change of the state of the switchable optical element is affected. This is preferably realized with a signal of high frequency and low amplitude compared to the AC driving signal.

For applying the test signal, the first electrode of the switchable optical element comprises at least two contacts. The signal line for applying the test signal is split into two signal lines and applies the test signal to both contacts. The contacts of the second electrode are connected to a reference potential, preferably a ground potential.

When two signal lines are connected to a substrate of a normal, non-broken switchable optical element, the current flow due to the test signal is the same through both signal lines. As a result no (or hardly any) voltage difference can be measured between these two connections.

When at least one of the substrates is broken or damaged, the electrical properties of the switchable optical element change. In an equivalent circuit this may be represented in that one or more of the resistors and/or capacitors that make up the total capacitance or resistance are missing or have changed (see for example FIG. 4). The current flow towards the switchable optical element becomes asymmetric. This results for example in a voltage difference between the two signal lines connected to the substrate. On a switchable optical element with at least one damaged substrate this voltage difference can be measured as difference signal. This difference signal can be measured for example with a galvanic isolated scope or by using a differential amplifier.

For detecting a broken substrate, one or more parameter of the measured differential signal may be analyzed. The one or more parameter is preferably selected from an amplitude, a phase shift and/or a waveform deformation. Preferably, this parameter is determined from a signal represented as voltage over time.

In order to detect a change of the one or more parameter, the one or more analyzed parameter is preferably compared to a respective reference value. The reference value may be predetermined or may be set in an initial calibration measurement. If the change, which may be represented by the absolute value of the difference between the respective parameter and reference value, exceeds a predetermined threshold, a broken substrate is detected.

Additionally or alternatively the one or more analyzed parameter may be compared to a predetermined threshold and a broken substrate is detected, if the parameter exceeds the predetermined threshold.

Additionally or alternatively the respective parameter is preferably compared to a floating average of previously measured values of the respective parameter. If the change, which may be represented by the absolute value of the difference between the respective parameter and the floating average, exceeds a predetermined threshold, a broken substrate is detected.

Preferably, the test signal is a periodic signal with a frequency different from the frequency of an AC driving signal of the switchable optical element. Suitable examples for periodic signals are sine and square signals. The AC driving signal is configured to switch and/or hold the switchable optical element in one of the states of the switchable optical element. In contrast, the test signal is preferably configured such that the test signal does not affect a change in state of the switchable optical element. In order not to affect the state of the switchable optical element, the test signal has preferably a frequency chosen in the range of from 1 kHz to 1000 kHz, especially preferred from a range of from 5 kHz to 40 kHz. Preferably, the test signal has a fixed frequency. It has been found that the frequency should be chosen to 5 kHz or higher in order to assure proper differential signal detection. Below 5 kHz it has been found that a significant attenuation of the sine wave exists which should preferably be avoided.

Further, the amplitude, which may be represented as a peak to peak voltage, should be lower than the switching threshold of the switchable layer of the switchable optical element.

Preferably, the peak to peak voltage of the test signal is in the range of from 10 mV to 1000 mV, preferably in the range of from 100 mV to 300 mV Usually, the differential signal has a frequency which corresponds to the frequency of the test signal. This may be used in the analysis of the test signal by applying a band pass filter centered on the frequency of the test signal. By use of such a filter electrical noise may be reduced which facilitates further analysis of the differential signal.

As source for the test signal a function generator may be used. In one embodiment, a further function generator as source for the AC driving signal is used and the two function generators are connected in series and are used to apply a sum signal comprising the test signal and the AC driving signal to the at least two contacts of the first electrode. In an alternative embodiment an arbitrary function generator may be used in order to generate the sum signal comprising both the test signal and the AC driving signal.

In the second variant ii) of the method passive measurement is performed wherein at least one capacitance between one contact of the first electrode and one contact of the second electrode is measured. In a basic equivalent circuit the switchable optical element can be seen as a parallel plate capacitor. If at least one of the substrates is damaged, the capacitance will change. The initial capacitance depends on the area of the switchable optical element, the size of the gap between the two substrate layers and the dielectric properties of the switchable layer.

In order to detect a change of the measured capacitance, the measured capacitance is preferably compared to a reference capacitance. The reference capacitance may be predetermined or may be set in an initial calibration measurement. If the change, which may be represented by the absolute value of the difference between the measured capacitance and the reference capacitance, exceeds a predetermined threshold, a broken substrate is detected.

Additionally or alternatively, the measured capacitance is compared to a predetermined threshold and a broken substrate is detected if the measured capacitance is below the predetermined threshold.

During operation of the switchable optical element, an AC driving signal which is configured to switch and/or hold the switchable optical element in one of the states of the switchable optical element may be applied to the switchable optical element by connecting a signal source to the first and second electrode. The AC driving signal may influence the capacitance measurement depending on the current switching state and the properties of the switchable layer. Thus, it is preferred to consider the current switching state and the properties of the switching layer when choosing a reference capacitance. Further, a different reference capacitance may be chosen for each of the different states of the switchable layer.

Additionally or alternatively the capacitance is preferably compared to a floating average of previously measured capacitance values. If the change, which may be represented by the absolute value of the difference between the capacitance and the floating average, exceeds a predetermined threshold, a broken substrate is detected.

Using a floating average is advantageous as the need for a calibration in order to account for different sizes of the switchable optical element and specific properties of the switchable layer are avoided.

In the third variant iii) of the method passive measurement is performed wherein at least one resistance between two contacts of the first electrode and/or between two contacts of the second electrode is measured. In a basic equivalent circuit each of the electrodes can be seen as a sheet resistor. If one of the substrates is damaged and thus the electrodes located on the respective substrate is damaged, the electrical resistance changes. The initial resistance depends on the size of the electrode and the material of the electrode.

In order to detect a change of the measured resistance, the measured resistance is preferably compared to a reference resistance. The reference resistance may be predetermined or may be set in an initial calibration measurement. If the change, which may be represented by the absolute value of the difference between the measured resistance and the reference resistance, exceeds a predetermined threshold, a broken substrate is detected.

Additionally or alternatively the measured resistance is compared to a predetermined threshold and a broken substrate is detected if the measured resistance exceeds the predetermined threshold.

Additionally or alternatively the resistance is preferably compared to a floating average of previously measured resistance values. If the change, which may be represented by the absolute value of the difference between the resistance and the floating average, exceeds a predetermined threshold, a broken substrate is detected.

Using a floating average is advantageous as the need for a calibration in order to account for different sizes of the switchable optical element and specific properties of the electrodes are avoided.

An AC driving signal which is configured to switch and/or hold the switchable optical element in one of the states of the switchable optical element may be applied to the switchable optical element by connecting a signal source to the first and second electrode using a single contact of the first electrode and a single contact of the second electrode. Thus, the resistance measurement and the driving of the switchable optical element do not interfere.

In the fourth variant iv) of the method active measurement is performed wherein the AC driving signal which is used to switch the switchable optical element into a state or to hold the switchable optical element in a state is applied to the at least one contact of the first electrode and to the at least one contact of the second electrode.

In a basic equivalent circuit the switchable optical element may be represented by a first resistor, a capacitor and a second resistor connected in series. When the AC driving signal is applied, the capacitor is periodically charged and discharged, thus an AC current is flowing due to the AC driving signal. The current is measured. A change in the measured current while the AC driving signal is unchanged may indicate a short circuit between the two electrodes due to at least one broken substrate. In the basic equivalent circuit this may be represented by an additional resistor connected in parallel to the capacitor.

In order to detect a change of the measured current, the measured current is preferably compared to a reference current. The reference current may be predetermined or may be set in an initial calibration measurement. If the change, which may be represented by the absolute value of the difference between the measured current and the reference current, exceeds a predetermined threshold, a broken substrate is detected.

Additionally or alternatively the measured current is compared to a predetermined threshold and a broken substrate is detected if the measured current exceeds the predetermined threshold.

Additionally or alternatively the current is preferably compared to a floating average of previously measured current values. If the change, which may be represented by the absolute value of the difference between the resistance and the floating average, exceeds a predetermined threshold, a broken substrate is detected.

Using a floating average is advantageous as the need for a calibration in order to account for different sizes of the switchable optical element and specific properties of the electrodes and the switchable layer are avoided. Further, a reliable measurement of absolute currents is more difficult than detecting a change, especially for low peak to peak voltages of the AC driving signal. Thus, comparing the measured value to previously values and thus only detecting changes of the measured current is preferred.

Preferably, two of the variants i) to iv) are combined for detecting a broken substrate of the switchable optical element. In an especially preferred embodiment, three of the variants i) to iv) are combined and most preferred all four variants i) to iv) are combined. By using more than one variant for detecting a broken substrate the reliability of the detection can be improved. Further, by combining more than one of the variants the electrical properties of the switchable optical element are thoroughly tested so that it is possible to reliably detect even small damages which may affect the performance of the switchable optical element.

Preferably, at least two switchable optical elements are connected in parallel. This allows the use of common driving and breakage detection components for several switchable optical elements. In a first variant, each of the switchable optical elements is connected to a common signal source by individual signal lines wherein each of the individual signal lines has a measurement resistor. Each of the switchable optical elements is connected to an individual measurement device or to a different channel of a common measurement device. In a second variant, the at least two switchable optical elements are connected in parallel to the same pair of signal lines and are connected to the same measurement device.

Preferably, the switchable optical element is part of a window of a building or a vehicle. Such a window may comprise one or more switchable optical elements. The switchable optical elements may be arranged in a stacked configuration, wherein each of the switchable optical elements preferably has different optical properties. Additionally or alternatively several switchable optical elements may be arranged next to each other in a single plane, thus forming a larger window. If two or more switchable optical elements are included in a window, each of the switchable optical elements may be connected to an individual circuit for supplying the AC driving voltage and/or for detection of breakage of at least one substrate. Alternatively, at least two switchable optical elements may be connected to a common component for supplying the AC driving voltage and/or for detecting breakage of at least one substrate.

A further aspect of the invention is providing a switchable optical device comprising at least one switchable optical element and a first signal generator for generating an AC driving signal, the at least one switchable optical element comprising a first substrate and a second substrate, the first substrate being coated with a first electrode and the second substrate being coated with a second electrode, and a switchable layer, the switchable layer being sandwiched between the first and second substrate, the first electrode and second electrode each having at least one contact.

Preferably, the switchable optical device is configured to carry out at least one of the variants of the described method. Thus, features described with respect to the method also apply to the switchable optical device and features described with respect to the switchable optical device also apply to the method.

In a first variant i) the switchable optical device further comprises a second signal generator for generating a test signal, the test signal being an AC signal, a measuring unit and an evaluation unit, the output of the second signal generator being split into two signal lines. The first electrode has at least two contacts and each signal line is connected to another one of the at least two contacts of the first electrode. At least one contact of the second electrode is connected to a reference potential. The measuring unit is connected to the two signal lines and the measuring unit is configured for measuring a differential signal. The evaluation unit is configured to detect a broken substrate if at least one parameter of the differential signal exceeds a predetermined threshold or if a change of at least one parameter of the differential signal exceeds a predetermined threshold.

In a second variant ii) the switchable optical device further comprises a measuring unit and an evaluation unit. The measuring unit is configured to measure a capacitance between one contact of the first electrode and one contact of the second electrode. The evaluation unit is configured to detect a broken substrate if the measured capacitance is below a predetermined threshold or if a change of the measured capacitance exceeds a predetermined threshold.

In a third variant iii) the switchable optical device further comprises a measuring unit and an evaluation unit. The first electrode and/or the second electrode have at least two contacts and the measuring unit is configured to measure an electrical resistance between the two contacts of at least one of the first electrode and the second electrode. The evaluation unit is configured to detect a broken substrate if the measured resistance exceeds a predetermined threshold or if a change of the measured resistance exceeds a predetermined threshold.

In a fourth variant iv) the switchable optical device further comprises a measuring unit and an evaluation unit. The measuring unit is configured to measure a current of the AC driving signal between one contact of the first electrode and one contact of the second electrode. The evaluation unit is configured to detect a broken substrate if the measured current exceeds a predetermined threshold or if a change of the measured current exceeds a predetermined threshold.

The measuring unit, the evaluation unit, the first signal generator and the second signal generator may be constructed as separate devices. Alternatively, one or more of the measuring unit, the evaluation unit, the first signal generator and the second signal generator may be combined in a single device.

Preferably, the first signal generator and the second signal generator of variant i) are constructed as a single arbitrary function generator for generating a sum signal comprising both the AC driving signal and the test signal. Thus, only a single signal source must be connected to the switchable optical element.

Each of the four variants i) to iv) may be used alone are in combination with at least one other of the four variants. When more than one variant is used, the respective measurement units and/or evaluation units may be combined in one device.

Additionally or alternatively, variant i) may be carried out wherein the first substrate and the second substrate are interchanged. E. g. the signal lines are connected to two contacts of the second electrode and at least one contact of the second electrode is connected to the reference potential.

The at least one switchable optical element is preferably a sandwich structure wherein a switchable layer is embedded between two substrate layers.

The substrate may consist of glass or of a polymer. Suitable glass substrates include for example float glass, down drawn glass, chemically toughened glass, borosilicate glass and aluminosilicate glass. Suitable polymer substrates include for example polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) and TAC (triacetylcellulose).

The switching layer preferably comprises a liquid-crystalline medium. A liquid-crystalline medium is defined as a substance having the properties of a liquid crystal. Typical liquid-crystalline media comprise at least one composition having elongated rod-shaped molecules. The two substrates and the liquid-crystalline medium are arranged as a cell wherein the liquid-crystalline medium is placed in the gap formed by the two substrates. The size of the gap is preferably from 1 µm to 300 µm, preferably from 3 to 100 µm and more preferably from 20 to 100 µm.

Each of the substrates is coated with an electrode. The electrode may be transparent, non-transparent or semi-transparent. Preferably, a conductive transparent oxide (TCO) is used as electrode. A suitable example for a transparent electrode is an indium-tin-oxide (ITO) transparent electrode.

The substrates are preferably orientated such that the sides coated with the electrodes face each other in the sandwich structure.

In addition, the substrates may additionally comprise an alignment film which is arranged on the side facing towards the switchable layer. The alignment film may be rubbed in an alignment direction.

Preferably, the at least one contact of the first electrode and the second electrode are located at a corner of the respective substrate, wherein in variants i) and iii) the at least two contacts of each electrode are located at opposing corners of the respective substrate. Preferably, the two glass substrates are cut by removing two diagonally opposite corners of the rectangular substrate to allow access to the contacts.

Preferably, the contacts of the first electrode layer and the contacts of the second electrode layer are located on different corners of the switchable optical element.

Preferably, at least two switchable optical elements are connected in parallel. This allows the use of common components such as first signal generator, second signal generator, measurement unit and/or evaluation unit for several switchable optical elements.

Preferably, the switchable optical element of the switchable optical device is part of a window of a building or a vehicle. The switchable optical element may comprise one or more switchable optical elements. The switchable optical elements may be arranged in a stacked configuration, wherein each of the switchable optical elements preferably has different optical properties. Additionally or alternatively several switchable optical elements may be arranged next to each other in a single plane, thus forming a larger window.

BRIEF DESCRIPTION OF THE DRAWINGS

The drawings show:

FIG. 1 depicts a schematic diagram of a passive breakage detection of substrates of a switchable optical element 10 using resistance measurement.

The switchable optical element 10 is obtained by preparing two sheets of conductive coated glass used as substrates. Two switchable optical elements 10 of different sizes are prepared. The size of the glass sheets for the first sample was 30 cm×40 cm. For the second sample glass sheets of 20 cm×30 cm with a different coating are used.

Using glass cutting and grinding, two opposing corners of each of the substrates are cut. After washing the substrates, polyimide is printed on their transparent conductive oxide (TCO) coated side. The substrates are then baked in an oven and the polyimide is rubbed to obtain alignment layers with a mutual rotation of 90° (twisted nematic configuration). Subsequently, the substrates are arranged as a cell with a 25 µm cell gap. The substrates are orientated such that the alignment layers face inside the cell gap. When combined into a cell, the cut corner of one substrate is facing the non-cut corner of the other substrate, resulting in four areas where electrical contact can be established. The cell is filled with a dye doped liquid crystal mixture using vacuum filling, pressed and placed into an oven for a final curing step. Electrical wiring is attached onto the contact areas by soldering.

Figure 1:
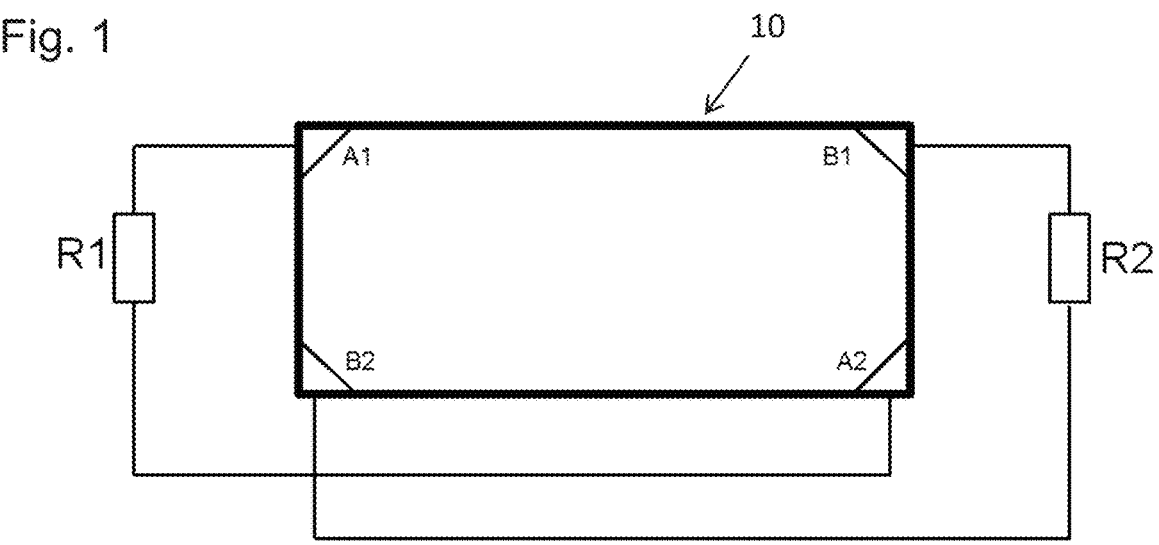
FIG. 1 breakage detection using passive resistance measurement.

The first substrate has two contacts labeled A1 and A2 in FIG. 1. Likewise, the second substrate has two contacts labeled B1 and B2 in FIG. 1. The resistance R1 of the TCO electrode of the first substrate and the resistance R2 of the second substrate may for example be measured using a multimeter.

For testing the two prepared samples a Fluke 175 multimeter is used. For the non-broken switchable optical elements the resistance values (R1 and R2) of the two substrate layers are both about 340Ω for the first sample and about 65Ω for the second sample. Subsequently, the two samples are broken and the measurement of the resistance values is repeated. The measured resistance for both samples was higher than 1 MΩ.

Figure 2:
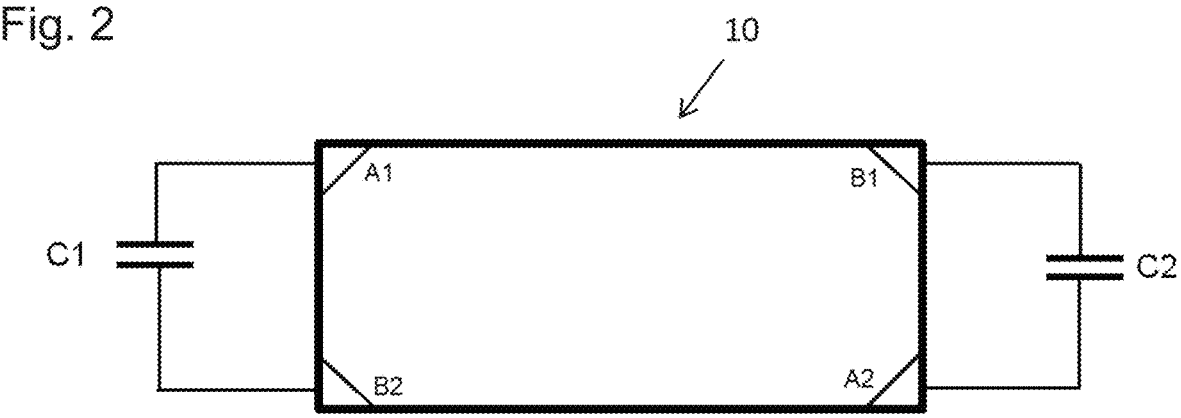
FIG. 2 breakage detection using passive capacitance measurement.

FIG. 2 depicts a schematic diagram of a passive breakage detection of substrates of a switchable optical element 10 using capacitance measurement.

Two samples are prepared as described with respect to FIG. 1. A first capacitance C1 is measured between one of the contacts of the first substrate, for example contact A1, and one of the contacts of the second substrate, for example contact B1. Optionally, a second capacitance C2 is measured between the contacts A2 and B2.

The capacitance of the switchable optical element 10 may be measured with a multimeter. For the measurements on the prepared samples a Fluke 175 multimeter is used. The measurement results are given in table 1.

TABLE 1

| Sample | Cx | Non-broken | Broken |
|--------|----|------------|--------|
| 1 | C1 | 200 nF | 60 nF |
|   | C2 | 200 nF | 5 nF |
| 2 | C1 | 100 nF | 15 nF |
|   | C2 | 100 nF | 2 nF |

A clear difference can be observed between the broken and the non-broken state.

Figure 3:
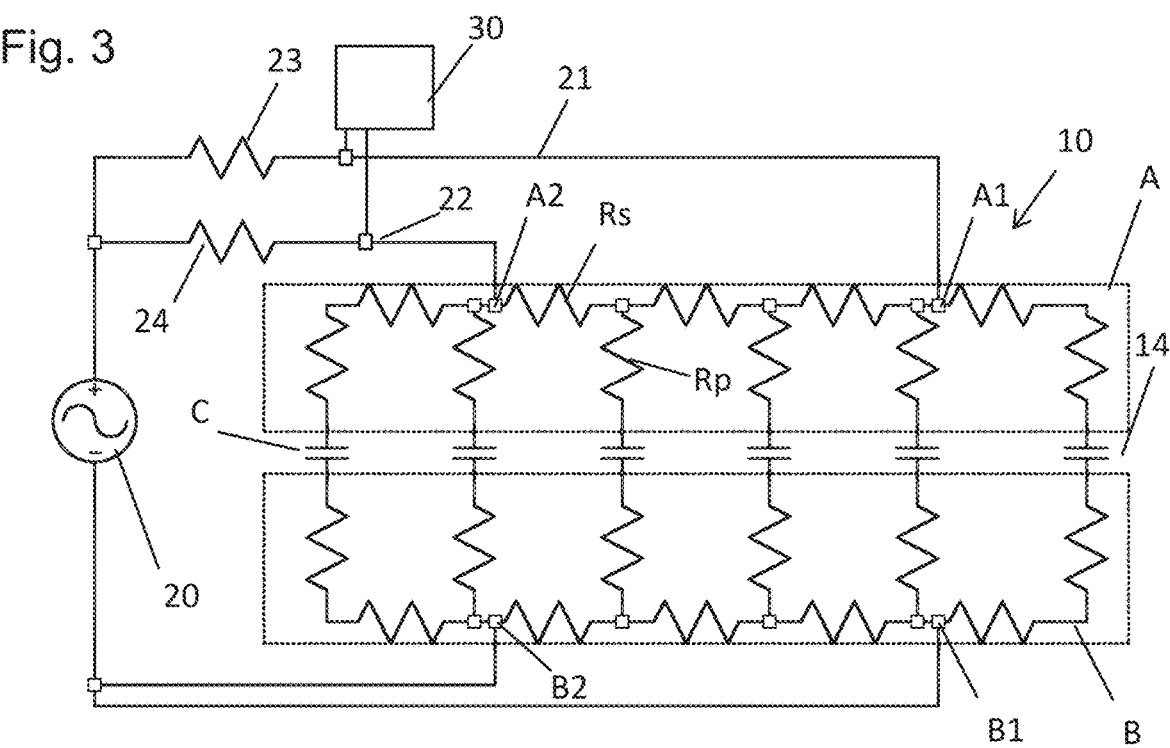
FIG. 3 an equivalent circuit for active measurement on a non-broken switchable optical element, FIG. 4 an equivalent circuit for active measurement on a switchable optical element with damaged first substrate, FIG. 5a difference signal measurement on a non-broken switchable optical element without test signal, FIG. 5b difference signal measurement on a non-broken switchable optical element with applied test signal, FIG. 6a difference signal measurement on a broken switchable optical element without test signal, FIG. 6b difference signal measurement on a broken switchable optical element with a first test signal applied, FIG. 6c difference signal measurement on a broken switchable optical element with a second test signal applied, FIG. 7 an equivalent circuit for active measurement on a switchable optical element with short circuit between the substrates, FIG. 8a difference signal of a broken switchable optical element with short circuit without test signal, FIG. 8b difference signal of a broken switchable optical element with short circuit with a test signal applied, FIG. 9 a first measurement setup for active measurement on two switchable optical elements, FIG. 10a a trace of a first differential signal measurement, FIG. 10b a trace of a second differential signal measurement, FIG. 11 a second measurement setup for active measurement on two switchable optical elements connected in parallel, and FIG. 12 a trace of a differential signal of two parallel connected switchable optical elements.

FIG. 3 shows an equivalent circuit for active measurement on a non-broken switchable optical element 10.

The switchable optical element 10 comprises in this order a first substrate A, a switchable layer 14 and a second substrate B arranged in a sandwich structure. The first substrate A and the second substrate B are each coated with an electrode on their sides facing the switchable layer 14.

In the depicted equivalent circuit the electrodes are represented by a network of resistors $R_s$ and $R_p$ and the switchable layer 14 is represented by a plurality of capacitors C. In the depicted sample of an equivalent circuit, five resistors $R_s$ are connected in series and located in the plane of the respective substrate A and B and six resistors $R_p$, which are arranged in parallel, are each connected on one side to one of the resistors $R_s$. The other side of each of the resistors $R_p$ is connected to one of the capacitors C of the switchable layer 14.

In order to detect a broken substrate A, B, a signal generator 20 is used to apply a test signal to the switchable optical element 10. The signal generator 20 is also used to generate the AC driving signal. The positive output + of the signal generator 20 is split into two signal lines 21, 22. A first signal line 21 comprising a first measurement resistor 23 is connected to a first contact A1 of the first substrate A. A second signal line 22 comprising a second measurement resistor 24 is connected to a second contact A2 of the first substrate A. Two contacts B1 and B2 of the second substrate B are connected to the reference potential—of the signal generator 20.

Figure 5A:
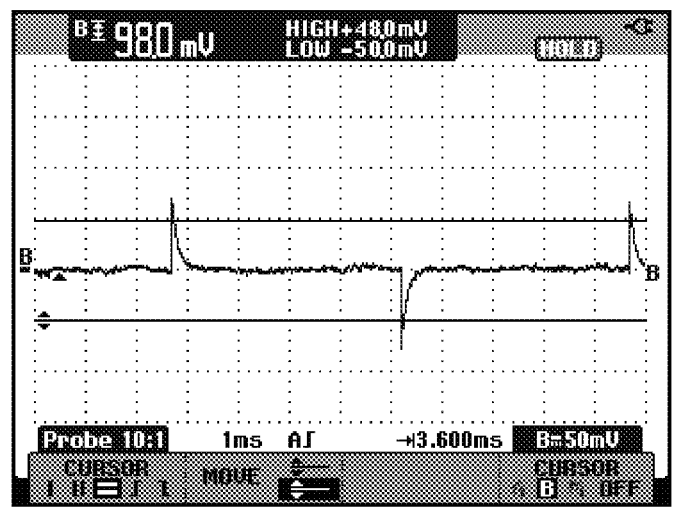
Figure 5B:
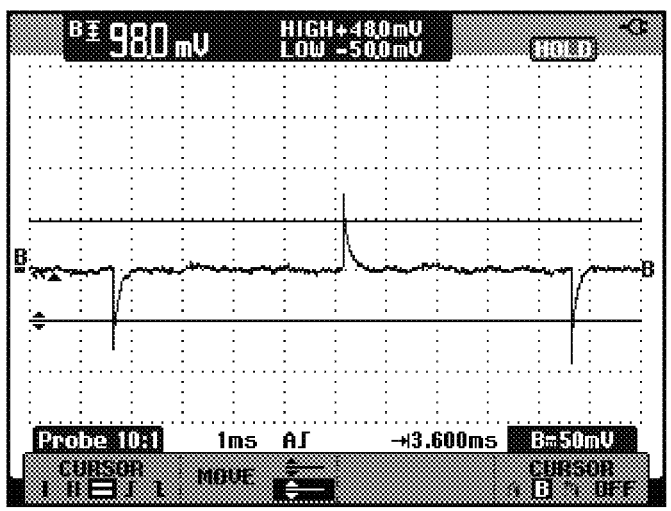

A measurement device 30 is connected to both signal lines 21 and 22 and is configured to measure a differential signal. For example, the measurement device 30 may be a galvanic isolated scope or may be based on a differential amplifier. Measurement results are shown in FIGS. 5a and 5b, wherein FIG. 5a shows a differential signal measurement wherein only the AC driving signal was applied and FIG. 5b shows a differential signal measurement wherein both the AC driving signal and the test signal were applied.

In the situation depicted in FIG. 3, both substrates are non-broken. According to the equivalent circuit of FIG. 3, the two contacts A1 and A2 have the same potential and the current flowing through both signal lines 21 and 22 is equal. Thus, no differential signal or only a small differential signal may be detected.

Figure 4:
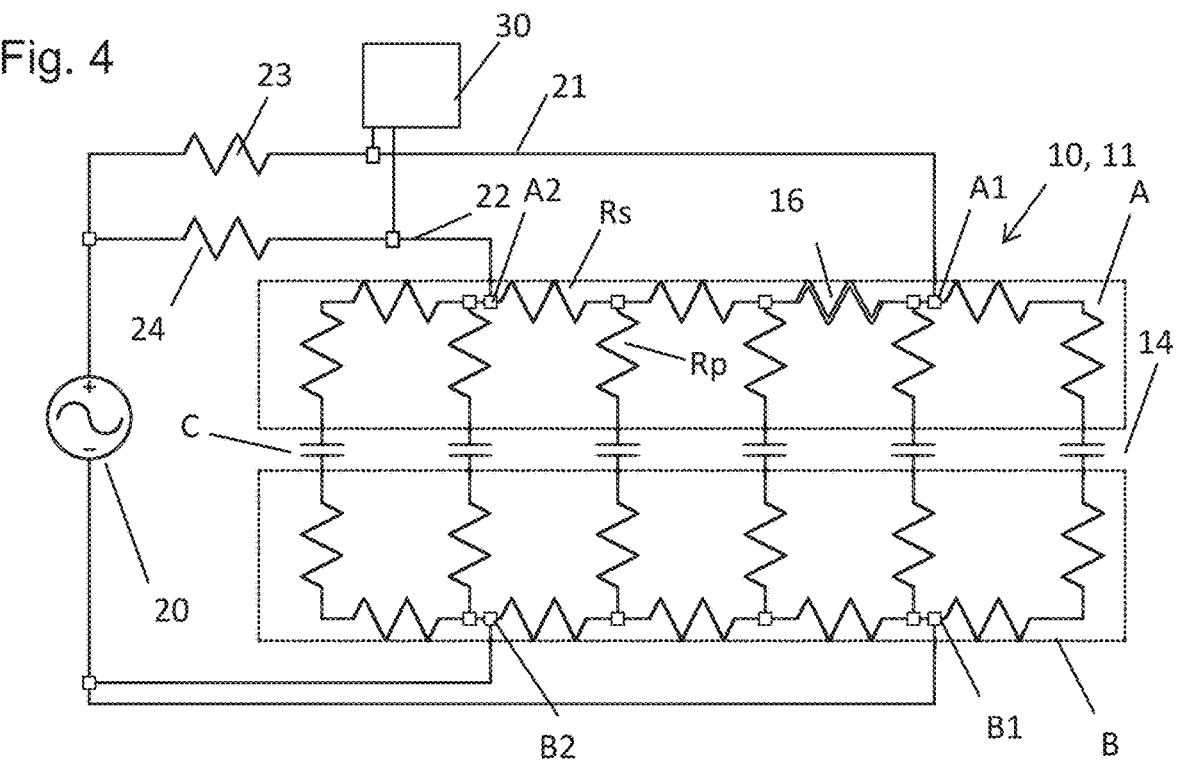

FIG. 4 shows an equivalent circuit for active measurement on a broken switchable optical element 11.

As already described with respect to FIG. 3, the switchable optical element 10 comprises in this order the first substrate A, the switchable layer 14 and the second substrate B arranged in a sandwich structure. The first substrate A and the second substrate B are coated with an electrode on their sides facing the switchable layer 14.

In the depicted equivalent circuit the electrodes are represented by a network of resistors $R_s$ and $R_p$ and the switchable layer 14 is represented by a plurality of capacitors C. In the depicted sample of an equivalent circuit, five resistors $R_s$ are connected in series and located in the plane of the respective substrate A and B and six resistors $R_p$, which are arranged in parallel, are each connected on one side to one of the resistors $R_s$. The other side of each of the resistors $R_p$ is connected to one of the capacitors C of the switchable layer 14.

Any damage to the switchable optical element 10 will induce a change of at least one of the resistors $R_s$ and $R_p$ and/or at least one of the capacitors C. In the example shown in FIG. 4, the first substrate A of the broken switchable optical element 11 is damaged and the electrical resistance of resistor 16 which is located close to the first contact A1 is increased.

In order to detect the broken substrate A, the signal generator 20 is used to apply a test signal to the broken switchable optical element 11. The signal generator 20 is also used to generate the AC driving signal. The positive output + of the signal generator 20 is split into two signal lines 21, 22. The first signal line 21 comprising the first measurement resistor 23 is connected to the first contact A1 of the first substrate A. The second signal line 22 comprising the second measurement resistor 24 is connected to the second contact A2 of the first substrate A. The two contacts B1 and B2 of the second substrate B are connected to the reference potential—of the signal generator 20.

Figure 6A:
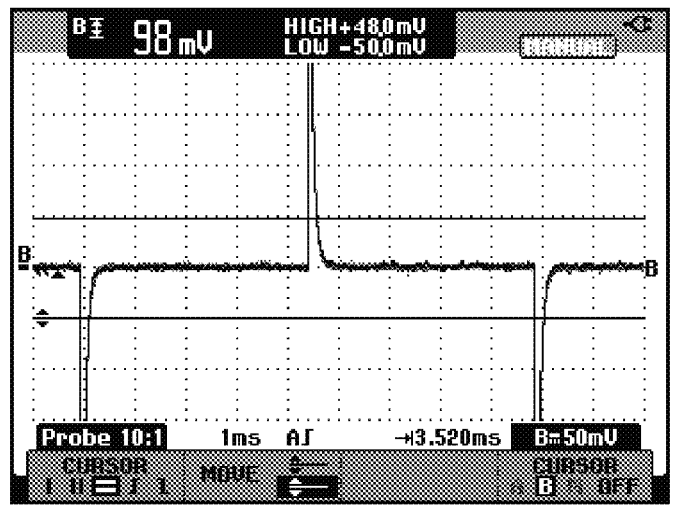
Figure 6B:
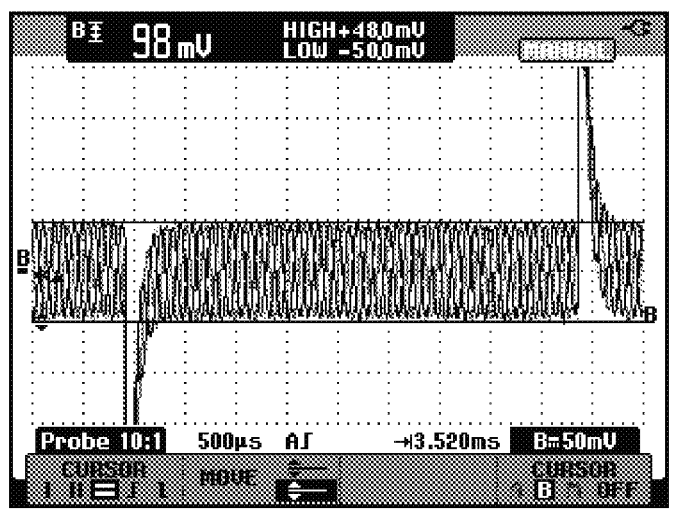
Figure 6C:
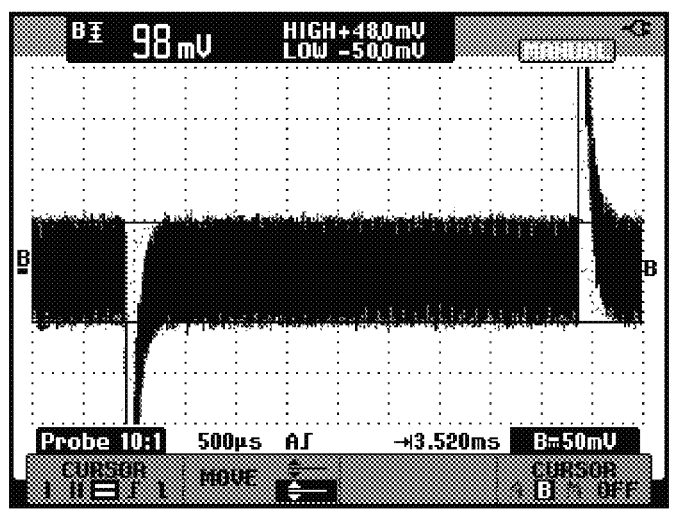

A measurement device 30 is connected to both signal lines 21 and 22 and is configured to measure a differential signal. Measurement results for the switchable optical device 10 with a damaged first substrate are shown in FIGS. 6a to 6c, wherein FIG. 6a shows a differential signal measurement wherein only the AC driving signal was applied, FIG. 6b shows a differential signal measurement wherein both the AC driving signal and a first test signal were applied and FIG. 6c shows a differential signal measurement wherein both the AC driving signal and a second test signal were applied.

FIGS. 5a and 5b show measurement results of a differential signal measurement of the non-broken switchable optical element 10 of FIG. 3.

A switchable optical element 10 is prepared as described with respect to FIG. 1. As measurement device 30 a Fluke 199C galvanic isolated scope is used. The traces obtained using the scope are shown in FIGS. 5a and 5b.

FIG. 5a shows a trace of a differential signal measurement wherein only the AC driving signal is applied. A 60 Hz square signal is applied as AC driving signal to hold the switchable optical element 10 in one of its states. The spikes in the trace are caused by charging/discharging of capacitors due to the AC driving signal. Otherwise, no differential signal is detected.

FIG. 5b shows a trace of a differential signal measurement wherein both the AC driving signal and a test signal are applied. The trace shows no difference to the trace of FIG. 5a without the test signal. Different sine wave test signals are tested having peak to peak voltages of from 100 mV to 300 mV and frequencies in the range of from 5 kHz to 40 kHz. No differential signal can be detected.

FIGS. 6a, 6b and 6c show measurement results of a differential signal measurement of the broken switchable optical element 11 of FIG. 4.

A switchable optical element 10 is prepared as described with respect to FIG. 1. The switchable optical element 10 is then damaged by breaking the substrates in order to obtain the broken switchable optical element 11. The resultant cracks in the substrates are pushed together in order to close any gaps. As measurement device 30 a Fluke 199C galvanic isolated scope is used. The traces obtained using the scope are shown in FIGS. 6a to 6c.

FIG. 6a shows a trace of a differential signal measurement wherein only the AC driving signal is applied. A 60 Hz square signal is applied as AC driving signal to hold the broken switchable optical element 11 in one of its states. The spikes in the trace are caused by charging/discharging of capacitors due to the AC driving signal. Otherwise, no differential signal is detected.

FIG. 6b shows a trace of a differential signal measurement wherein both the AC driving signal and a first test signal are applied. As first test signal a sine wave having a frequency of 5 kHz is used. A differential signal is detected indicating that the first contact A1 and the second contact A2 are not at the same potential due to changes in the resistance of the electrode of the first substrate A.

FIG. 6c shows a further trace of a differential signal measurement wherein both the AC driving signal and a second test signal are applied. As second test signal a sine wave having a frequency of 40 kHz is used. A differential signal is detected indicating that the first contact A1 and the second contact A2 are not at the same potential due to changes in the resistance of the electrode of the first substrate A. The detected differential signal has the same frequency as the test signal and is clearly visible in the trace shown in FIGS. 6b and 6c.

Figure 7:
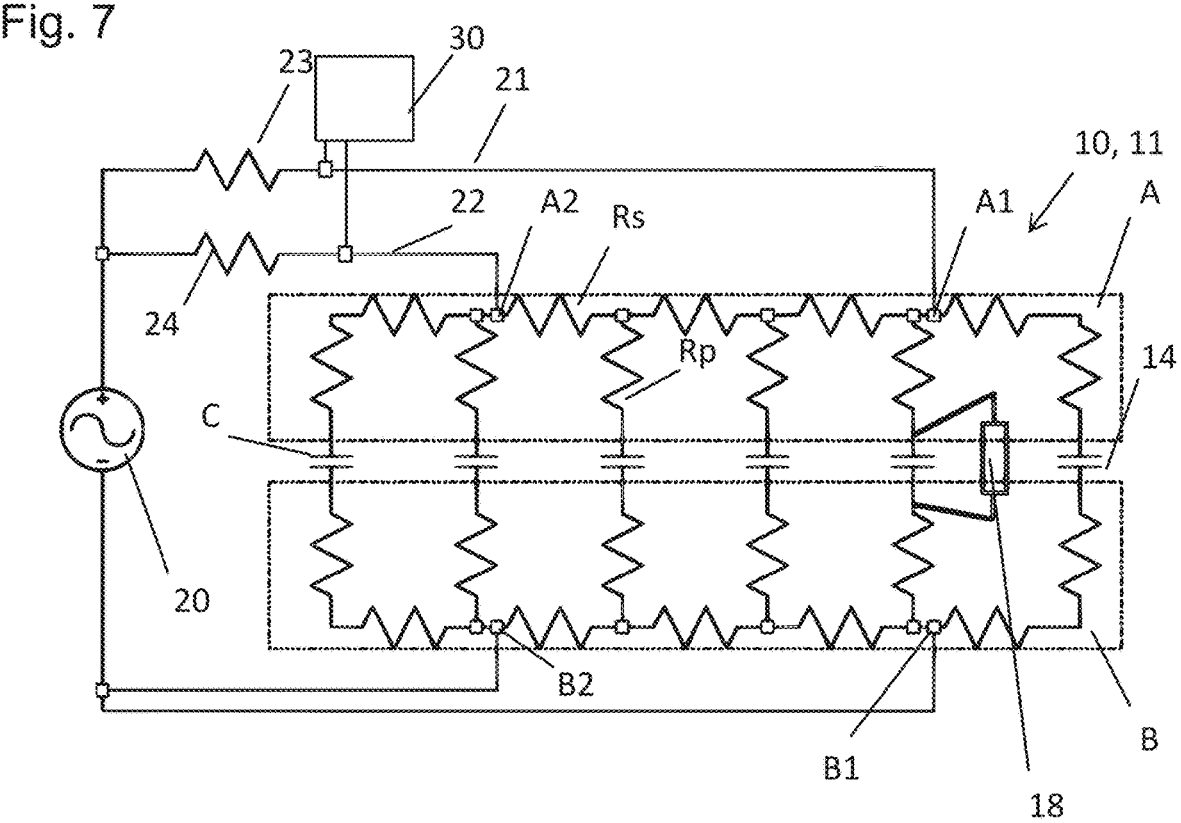

FIG. 7 shows an equivalent circuit for active measurement on a broken switchable optical element 11 having a short circuit.

As already described with respect to FIG. 3, the switchable optical element 10 comprises in this order the first substrate A, the switchable layer 14 and the second substrate B arranged in a sandwich structure. The first substrate A and the second substrate B are coated with an electrode on their sides facing the switchable layer 14.

In the depicted equivalent circuit the electrodes are represented by a network of resistors $R_s$ and $R_p$ and the switchable layer 14 is represented by a plurality of capacitors C. In the depicted sample of an equivalent circuit, five resistors $R_s$ are connected in series and located in the plane of the respective substrate A and B and six resistors $R_p$, which are arranged in parallel, are each connected on one side to one of the resistors $R_s$. The other side of each of the resistors $R_p$ is connected to one of the capacitors C of the switchable layer 14.

In addition to changes to at least one of the resistors $R_s$ and $R_p$ and/or at least one of the capacitors C breakage of at least one of the substrates A and B may induce a short circuit between the first electrode of the first substrate A and the second electrode of the second substrate B. In the example shown in FIG. 7, the broken switchable optical element 11 is damaged such that the two electrodes are in direct contact with each other. This is represented in the equivalent circuit of FIG. 7 by the addition of a resistor 18 which is connected in parallel to one of the capacitors C representing the switchable layer.

In order to detect a short circuit between the two electrodes, the signal generator 20 is used to apply an AC driving signal. Further, the signal generator 20 is used to apply a test signal to the broken switchable optical element 11. The positive output + of the signal generator 20 is split into two signal lines 21, 22. The first signal line 21 comprising the first measurement resistor 23 is connected to the first contact A1 of the first substrate A. The second signal line 22 comprising the second measurement resistor 24 is connected to the second contact A2 of the first substrate A. The two contacts B1 and B2 of the second substrate B are connected to the reference potential—of the signal generator 20.

A measurement device 30 is connected to both signal lines 21 and 22 and is configured to measure a differential signal. Measurement results for the broken switchable optical device 11 with a short circuit are shown in FIGS. 8a and 8b, wherein FIG. 8a shows a differential signal wherein only the AC driving signal was applied and FIG. 8b shows a differential signal wherein both the AC driving signal and a first test signal were applied.

In a further embodiment only the first signal line 21 is connected to one of the contacts A1, A2 of the first substrate A and a current flowing through the signal line 21 is measured, for example by detecting a voltage over the first measurement resistor 23. The signal generator 20 is only used to apply the AC driving signal. A short cut between the two electrodes of the broken switchable optical element 11 may then be detected as a change in the detected current.

Figure 8A:
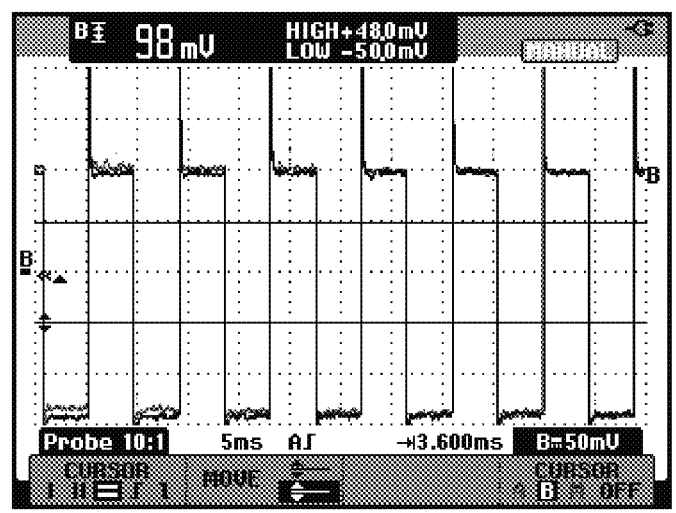

FIG. 8a shows a trace of a differential signal measurement on the broken switchable optical element 11 having a short circuit. In the measurement of FIG. 8a, only the AC driving signal is applied. A 60 Hz square signal is applied as AC driving signal to hold the broken switchable optical element 11 in one of its states. In addition to the spikes in the trace which are caused by charging/discharging of capacitors due to the AC driving signal an offset voltage is detected. The offset voltage is caused by a current flowing between the first electrode and the second electrode due to the short circuit. The current causes a voltage drop which is detectable in the differential signal as the current does not flow evenly through the two contacts A1 and A2. The flowing current may be used to detect the short circuit and thus to detect a broken switchable optical element.

Figure 8B:
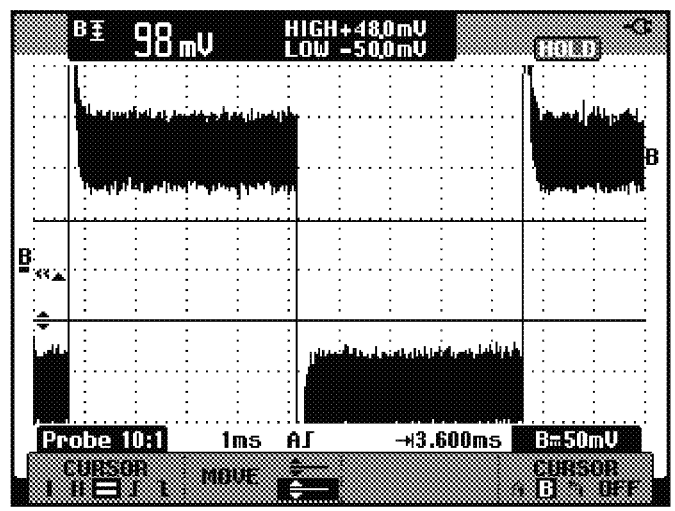

FIG. 8b shows a trace of a differential signal measurement on the broken switchable optical element 11 having a short circuit. Both the AC driving signal and a test signal are applied. As test signal a sine wave having a frequency of 40 kHz is used. In addition to the offset voltage due to a flowing current as shown in FIG. 8a a further differential signal is detected indicating that the first contact A1 and the second contact A2 are not at the same potential due to an uneven distribution of the current. The differential signal can be easily detected and used to detect a broken switchable optical element 11.

FIG. 9 shows a first measurement setup for simultaneous active measurement on two switchable optical elements 10.

Each of the switchable optical elements 10 is connected to a common signal generator 20 by individual signal lines 21, 22, 21', 22', wherein each of the individual signal 21, 22, 21', 22' lines has a measurement resistor 23, 24, 23', 24'. Each of the switchable optical elements 10 is connected to a different channel of a common measurement device 30.

In the setup depicted in FIG. 9, a first pair of signal lines 21, 22 is connected to the first contact A1 and the second contact A2 of the first substrate A of a non-broken switchable optical element 10 and a second pair of signal lines 21', 22' is connected to the first contact A1 and the second contact A2 of the first substrate A of a broken switchable optical element 11. The common signal generator 20 is constructed to generate both an AC driving signal and a test signal. The sum signal comprising both the AC driving signal and the test signal is split and applied to both pairs of signal lines 21, 22, 21', 22'. The respective contacts B1 and B2 of the second substrates B are each connected to a reference potential 26. The negative output – of the signal generator 20 is also connected to the reference potential 26.

Figure 10A:
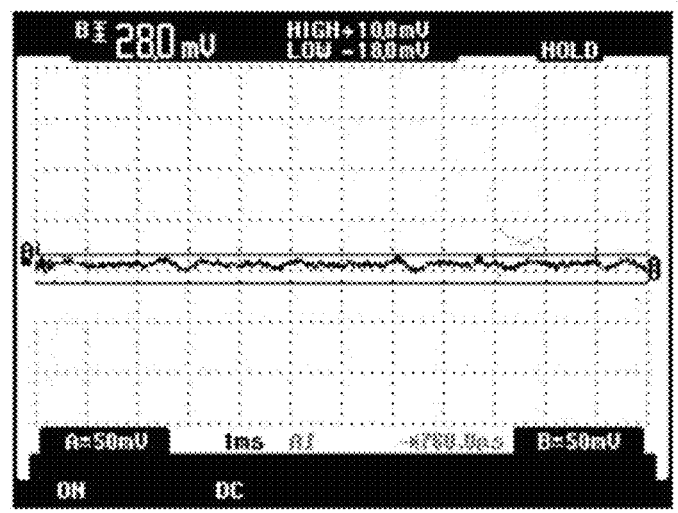
Figure 10B:
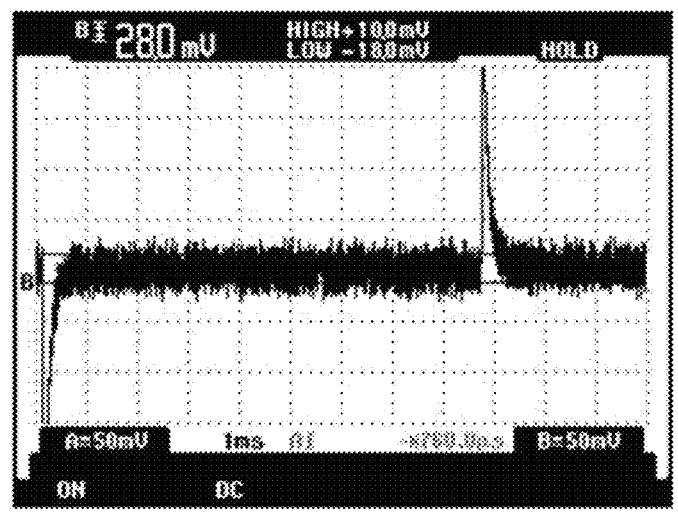

FIG. 10a shows a trace of a differential signal measurement on the non-broken switchable optical element 10 of the setup of FIG. 9. In the measurement of FIG. 10a, both the AC driving signal and the test signal are applied. A 60 Hz square signal is applied as AC driving signal to hold the non-broken switchable optical element 10 in one of its states. The test signal is a sine wave having a frequency of 40 kHz. As can be seen from the trace of FIG. 10a, no differential signal can be detected.

FIG. 8b shows a trace of a differential signal measurement on the broken switchable optical element 11 of the setup of FIG. 9. Both the AC driving signal and a test signal are applied. A differential signal is detected indicating that the first contact A1 and the second contact A2 are not at the same potential indicating that at least one of the substrates is broken.

Figure 11:
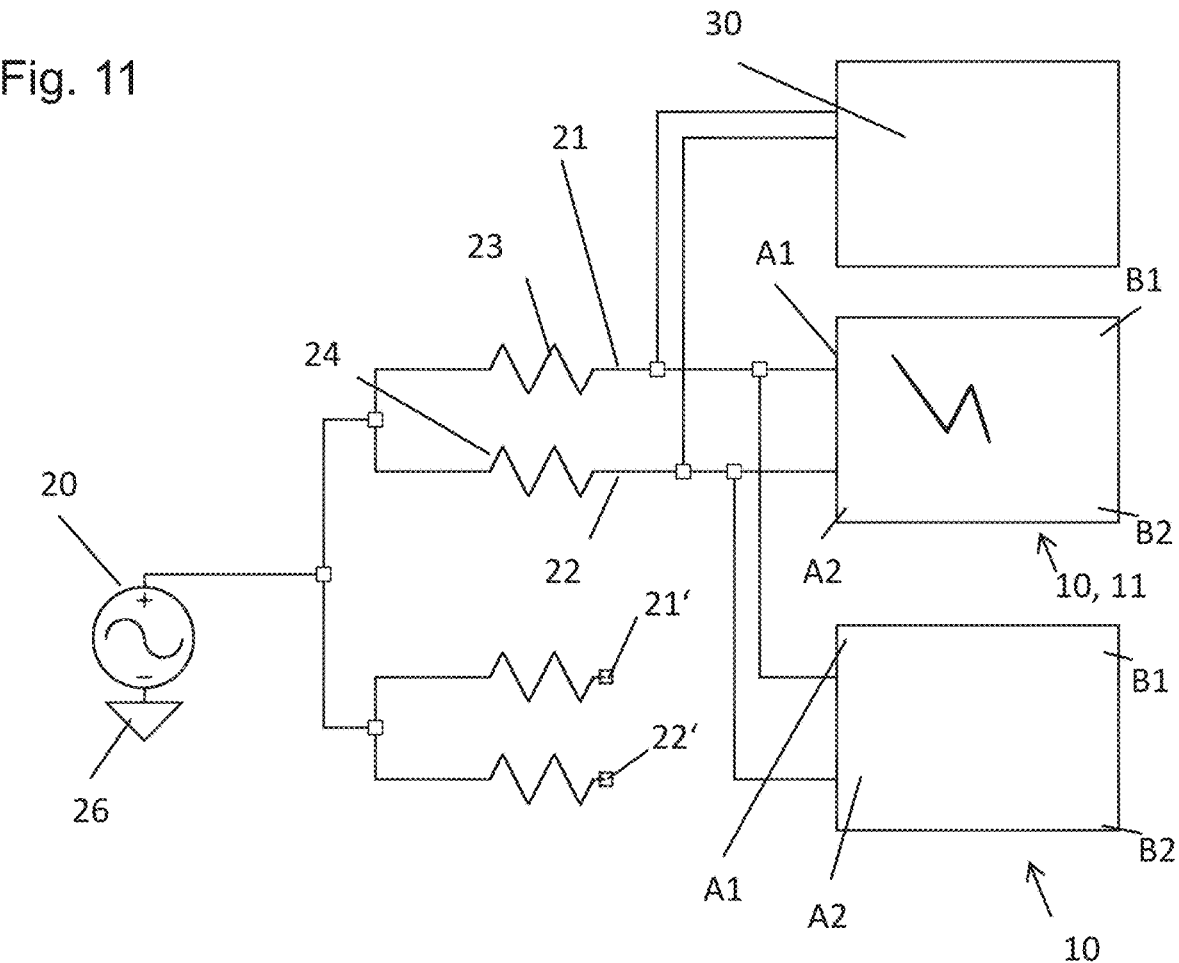

FIG. 11 shows a second measurement setup for simultaneous active measurement on two switchable optical elements 10.

Each of the switchable optical elements 10 is connected to a common signal generator 20 using the same pair of signal lines 21, 22 wherein each of the signal lines 21, 22 lines has a measurement resistor 23, 24. The two signal lines 21, 22 are connected to a measurement device 30 so that each of the switchable optical elements 10 is connected to the same common measurement device 30.

In the setup depicted in FIG. 11, the first signal line 21 is connected to the first contact A1 of a non-broken switchable optical element 10 and to the first contact A1 of a broken switchable optical element. Likewise, the second signal line 22 is connected to the second contact A2 of the non-broken switchable optical element 10 and to the second contact A2 of the broken switchable optical element 11. The common signal generator 20 is constructed to generate both an AC driving signal and a test signal. The resulting sum signal comprises both the AC driving signal and the test signal. The respective contacts B1 and B2 of the second substrates B are each connected to a reference potential 26. The negative output – of the signal generator 20 is also connected to the reference potential 26.

In the setup of FIG. 11 a second pair of signal lines 21' and 22' is shown but is not connected to any element. In further embodiments, the second pair of signal lines may be used for connecting one or more further switchable optical elements.

Figure 12:
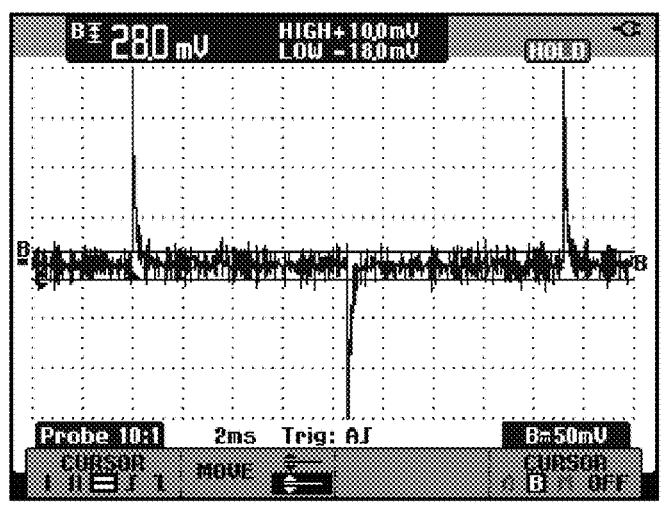

FIG. 12 shows a trace of a differential signal measurement on two parallel connected switchable optical elements 10 of the setup of FIG. 11. In the measurement of FIG. 12, both the AC driving signal and the test signal are applied. A 60 Hz square signal is applied as AC driving signal to hold the two switchable optical elements 10 in a predetermined state. The test signal is a sine wave having a frequency of 40 kHz. As can be seen from the trace of FIG. 12, a differential signal is detected indicating that at least one substrate of at least one of the two switchable optical elements 10 is broken.

The invention claimed is:

1. A method for detecting breakage of a substrate (A, B) of at least one
   switchable optical element (10),
   the at least one switchable optical element (10) comprising
   a first substrate (A) and a second substrate (B),
   the first substrate (A) being coated with a first electrode and the second substrate (B) being coated with a second electrode, and
   a switchable layer (14), the switchable layer (14) being sandwiched between the first substrate (A) and second substrate (B),
   the first electrode and second electrode each having at least one contact (A1, A2, B1, B2),
   the method comprising
   i)
   a) applying an electric field between the first electrode and the second electrode by applying a test signal provided by a test signal source to the at least one switchable optical element (10), wherein the test signal is an AC signal, and
   wherein
   an output of the test signal source is split into two signal lines (21, 22, 21', 22'),
   the first electrode having at least two contacts and each signal line (21, 22, 21', 22') being connected with another one of the contacts (A1, A2) of the first electrode,
   and the at least one contact (B1, B2) of the second electrode being connected to a reference potential (26),
   b) measuring of a differential signal between the two signal lines (21, 22, 21', 22'), and
   c) detecting a broken substrate if at least one parameter of the differential signal exceeds a predetermined threshold or if a change of at least one parameter of the differential signal exceeds a predetermined threshold, and/or the method comprising
   ii)

a) measuring a capacitance (C1, C2) between one contact (A1, A2) of the first electrode and one contact (B1, B2) of the second electrode, and
b) detecting a broken substrate if the measured capacitance (C1, C2) is below a predetermined threshold or if a change in the measured capacitance (C1, C2) exceeds a predetermined threshold,
and/or the method comprising
iii)
a) measuring an electrical resistance (R1) between two contacts (A1, A2) of the first electrode and/or measuring an electrical resistance (R2) between two contacts (B1, B2) of the second electrode, the first electrode and/or second electrode having at least two contacts (A1, A2, B1, B2), and
b) detecting a broken substrate if the measured resistance (R1, R2) exceeds a predetermined threshold or if a change in the measured resistance (R1, R2) exceeds a predetermined threshold,
and/or the method comprising
iv)
a) applying an electric field between the first electrode and the second electrode by applying an AC driving signal to the at least one contact (A1, A2) of the first electrode and to the at least one contact (B1, B2) of the second electrode, the AC driving signal being configured to switch and/or hold the switchable optical element (10) in one of the states of the switchable optical element (10),
b) measuring a current of the AC driving signal, and
c) detecting a broken substrate if the measured current exceeds a predetermined threshold or if a change in the measured current exceeds a predetermined threshold.

2. The method of claim 1, wherein the test signal of variant i) is a periodic signal with a frequency different from the frequency of an AC driving signal, the AC driving signal being configured to switch and/or hold the switchable optical element (10) in one of the states of the switchable optical element (10).

3. The method of claim 1, wherein the test signal of variant i) has a frequency of from 1 kHz to 1000 kHz.

4. The method of claim 1, wherein the peak to peak voltage of the test signal of variant i) is in the range of from 10 mV to 1000 mV.

5. The method of claim 1, wherein the test signal of variant i) is combined with the AC driving signal of the switchable optical element (10) so that a sum signal comprising the test signal and the AC driving signal is applied to the first electrode and the second electrode of the switchable optical element (10).

6. The method of claim 1, wherein at least one parameter of variant i) and/or a change of the capacitance (C1, C2) of variant ii) and/or a change of the resistance (R1, R2) of variant iii) and/or a change of the current of variant iv), is determined by comparing the respective measured value to a floating average of previously measured values.

7. The method of claim 1, wherein at least one reference value for a parameter of variant i) and/or a reference resistance of variant ii) and/or a reference capacitance of variant iii) and/or a reference current of variant iv), is set in an initial calibration measurement.

8. The method of claim 1, wherein at least two switchable optical elements (10) are connected in parallel.

9. The method of claim 1, wherein the switchable optical element (10) is part of a window of a building or a vehicle.

10. A switchable optical device comprising at least one switchable optical element (10) and a first signal generator for generating an AC driving signal, the at least one switchable optical element comprising a first substrate (A) and a second substrate (B), the first substrate (A) being coated with a first electrode and the second substrate (B) being coated with a second electrode, and a switchable layer (14), the switchable layer (14) being sandwiched between the first substrate (A) and second substrate (B), the first electrode and second electrode each having at least one contact (A1, A2, B1, B2),
wherein
the switchable optical device further comprises
i) a second signal generator generating a test signal, the test signal being an AC signal, a measuring unit and an evaluation unit, the output of the second signal generator being split into two signal lines (21, 22, 21', 22'), the first electrode having at least two contacts (A1, A2) and each signal line (21, 22, 21', 22') being connected to another one of the at least two contacts (A1, A2) of the first electrode and at least one contact (B1, B2) of the second electrode being connected to a reference potential (26),
the measuring unit being connected to the two signal lines (21, 22, 21', 22'), the measuring unit being configured for measuring a differential signal, and the evaluation unit being configured to detect a broken substrate if at least one parameter of the differential signal exceeds a predetermined threshold or if a change of at least one parameter of the differential signal exceeds a predetermined threshold,
and/or
ii) a measuring unit and an evaluation unit, the measuring unit being configured to measure a capacitance (C1, C2) between one contact (A1, A2) of the first electrode and one contact (B1, B2) of the second electrode and the evaluation unit being configured to detect a broken substrate if the measured capacitance (C1, C2) is below a predetermined threshold or if a change of the measured capacitance (C1, C2) exceeds a predetermined threshold,
and/or
iii) a measuring unit and an evaluation unit, the first electrode and/or the second electrode having at least two contacts (A1, A2, B1, B2) and the measuring unit being configured to measure an electrical resistance (R1, R2) between the two contacts (A1, A2, B1, B2) of at least one of the first electrode and the second electrode and the evaluation unit being configured to detect a broken substrate if the measured resistance (R1, R2) exceeds a predetermined threshold or if a change of the measured resistance (R1, R2) exceeds a predetermined threshold,
and/or
iv) a measuring unit and an evaluation unit, the measuring unit being configured to measure a current of the AC driving signal between one contact (A1, A2) of the first electrode and one contact (B1, B2) of the second electrode and the evaluation unit being configured to detect a broken substrate if the measured current exceeds a predetermined threshold or if a change of the measured current exceeds a predetermined threshold.

11. The switchable optical device of claim 10, wherein the at least one contact (A1, A2) of the first electrode and at least one contact (B1, B2) of the second electrode is located at a corner of the respective substrate (A, B), wherein in variants i) and iii) the at least two contacts (A1, A2, B1, B2) of each electrode are located at opposing corners of the respective substrate (A, B).

12. The switchable optical device of claim 10, wherein the contacts (A1, A2) of the first electrode layer and the contacts (B1, B2) of the second electrode layer are located on different corners.

13. The switchable optical device of claim 10, wherein at least two switchable optical elements (10) are connected in parallel.

14. The switchable optical device of claim 10, wherein the first signal generator and the second signal generator of variant i) are constructed as a single arbitrary function generator for generating a sum signal comprising both the AC driving signal and the test signal.

15. The switchable optical device of claim 10, wherein the switchable optical element (10) is part of a window of a building or a vehicle.

* * * * *